United States Patent [19]

Kachuk

[11] Patent Number: 4,958,096

[45] Date of Patent: Sep. 18, 1990

[54] GOVERNOR AND MOTOR ASSEMBLY

[75] Inventor: Paul T. Kachuk, Ft. Wayne, Ind.

[73] Assignee: Flint & Walling, Inc., Kendallville, Ind.

[21] Appl. No.: 367,152

[22] Filed: Jun. 16, 1989

Related U.S. Application Data

[62] Division of Ser. No. 137,847, Dec. 21, 1987, Pat. No. 4,885,440.

[51] Int. Cl.[5] .......... H02K 11/00; H01H 35/10

[52] U.S. Cl. .......... 310/68 E; 310/68 R; 200/80 R; 200/557; 200/61.46

[58] Field of Search .......... 310/68 E, 68 R; 200/80 R, 557, 553, 61.46; 318/793, 462; 388/924; 73/535, 536, 539, 550

[56] References Cited

U.S. PATENT DOCUMENTS

| | | | |
|---|---|---|---|
| 2,583,590 | 1/1952 | Osterhus | 73/550 |
| 2,991,340 | 7/1961 | Bickham | 200/80 R |
| 3,532,841 | 10/1970 | Hackbardt | 200/80 R |
| 4,593,163 | 6/1986 | Fisher | 200/80 R |

FOREIGN PATENT DOCUMENTS

| | | | |
|---|---|---|---|
| 4741150 | 12/1969 | Japan | 200/80 R |
| 757156 | 9/1956 | United Kingdom | 200/80 R |

*Primary Examiner*—Peter S. Wong
*Assistant Examiner*—C. E. LaBalle
*Attorney, Agent, or Firm*—Edgar A. Zarins; Malcolm L. Sutherland

[57] ABSTRACT

A governor and motor assembly of a fractional horsepower electric motor adapted to control the efficient operation of the motor utilizing simple structural components. The governor is responsive to the centrifugal forces of the rotating rotor shaft of the motor and is attached to the end thereof. The governor includes a carrier plate affixed to the shaft and a pivotable lever mounted within a groove in the carrier plate. A first end of the pivotable lever is connected to the carrier plate by an extension spring which acts to move the lever to its at rest or actuated position. As a predetermined rotational velocity is reached, the lever pivots at the groove to pivot away from the electrical switch aligned axially with the rotor shaft. The electrical switch, in turn, is mounted to a terminal board fixedly mounted to the motor housing to thereby positionally maintain the governor on the motor shaft as well as retain the associated capacitor. In this manner, a minimum of mounting hardware is needed to assemble the governor and control components. The motor housing is provided with indirect venting to prevent fluid splash from damaging the internal components of the motor.

7 Claims, 2 Drawing Sheets

GOVERNOR AND MOTOR ASSEMBLY

This is a divisional of co-pending application Ser. No. 137,847, filed on Dec. 21, 1987, now U.S. Pat. No. 4,885,440.

BACKGROUND OF THE INVENTION

I. Field of the Invention

This invention relates to a fractional horsepower electric motor assembly and, in particular, to a centrifugal governor mounted to the rotor shaft of the motor and positionally maintained by the terminal board associated with the components of the assembly.

II. Description of the Prior Art

Control components for electric motors vary widely in their structure and operation. Generally, these components are adapted for safe and efficient operation of the associated motor including shutoff of one of a plurality of windings of the motor when a predetermined rotational value is attained. Centrifugal governors utilize the radially outward inertia generated by rotation of the rotor shaft to engage and disengage an electrical switch. A pendulum weight may be utilized to make the governor more sensitive or to overcome other forces associated with the governor assembly. Such forces may include an extended spring designed to bias the pendulum towards its at rest position or mechanical levers which also move the weighted member towards the at rest position. However, many of these past known assemblies have been found to be unduly complicated resulting in failure of the switch and adding to the weight of the motor. In particular, the use of extension springs to bias the pendulum results in stretching of the spring over prolonged use which retards the sensitivity of the mechanism. Moreover, mechanical levers are subject to sticking and failure which can result in damage to the motor assembly. Frictional wear may also reduce the effectiveness of the governor switch.

The sensitivity to which the switch reacts to small changes in the rotational speed of the motor can be critical. Centrifugal switches which utilize a flyweight mass disposed close to the rotary axis of the shaft can be slow in reacting because the flyweight requires larger changes in rotation to be affected Furthermore, many pendulum weighted switches and extension spring switches can react to turbulence applied to the motor assembly. Such past known switches do not readily absorb such shocks.

The governor switch and its associated components are normally housed within the end bell of the motor housing and secured by individual mounting hardware. Thus, if a component fails the governor, switch, capacitor and/or terminal board must be laboriously disassembled for replacement. In addition to significantly increasing assembly and repair costs, the additional mounting hardware can add to the weight and size of the motor assembly. Moreover, regulatory requirements can also increase the size of the motor housing by requiring that any vent openings be positioned such that fluid splash will not reach the inner windings of the motor. This can require that the housing be unnecessarily long in order to properly position the vent openings.

SUMMARY OF THE PRESENT INVENTION

The present invention overcomes the disadvantages of the prior known motor assemblies by providing a motor which utilizes an efficient component structure that is simple to assemble and maintain.

The motor assembly of the present invention generally comprises a motor housing including a shell housing the stator assembly and an end bell within which the control components of the motor are housed. The rotor and shaft assembly extends through the housing. The end bell cover includes an indirect venting passageway which communicates with end vent openings formed in the main shell. The control components housed within the end bell include a centrifugal governor attached to the end of the rotor shaft, a switch mounted to a terminal board, and a capacitor. These components are positioned such that the terminal board maintains the capacitor, switch, and governor while utilizing only the mounting hardware for the terminal board. Thus, assembly, repair and maintenance of the motor assembly is significantly simplified. In addition, the indirect vent passageway reduces the overall length of the housing since the problem with fluid splash reaching the stator windings is eliminated.

The governor assembly of the present invention is a simple, lightweight device which reacts efficiently to changes in the rotational speed of the rotor shaft. The governor is a centrifugal assembly which includes a carrier plate mounted to the end of the rotor shaft. The carrier plate includes an integral fulcrum member formed perpendicular to the carrier plate and adapted to receive a pivotable lever. The lever includes an actuating arm normally disposed parallel to the carrier plate and an L-shaped pendulum disposed outwardly of the fulcrum and the rotational axis of the governor. A compression spring is fitted between the distal end of the actual arm and the carrier plate to bias the actuating arm away from the plate to depress the spring-biased plunger of the switch. As the rotor shaft rotates, the centrifugal forces associated therewith will cause the L-shaped member of the lever to pivot outwardly thereby causing the actuating arm to pivot away from the switch against the force of the compression spring. When the plunger of the switch moves outwardly with the actuating arm a predetermined distance, the switch will cause the start winding of the single phase motor to shut down in response to the rotational speed. By varying the compression force of the spring and the length or weight of the pivoting lever, the governor can be made responsive to various rotational speeds. Thus, the present invention provides a simple means of shutting down the start winding of the motor such that the motor operates on only the run winding thereafter.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
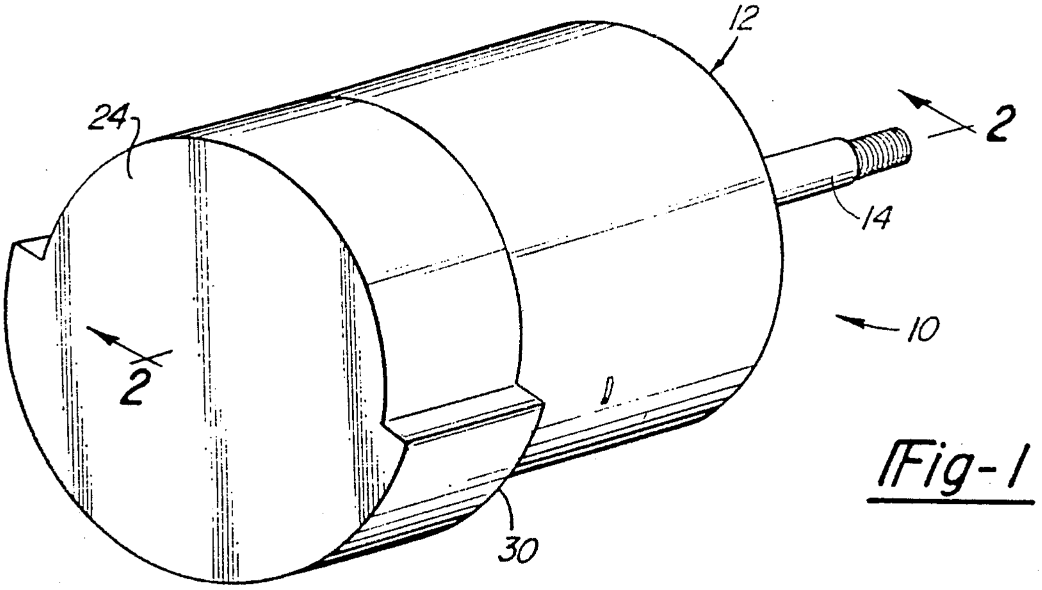
FIG. 1 is an elevational perspective of the motor assembly embodying the present invention.
Figure 2:
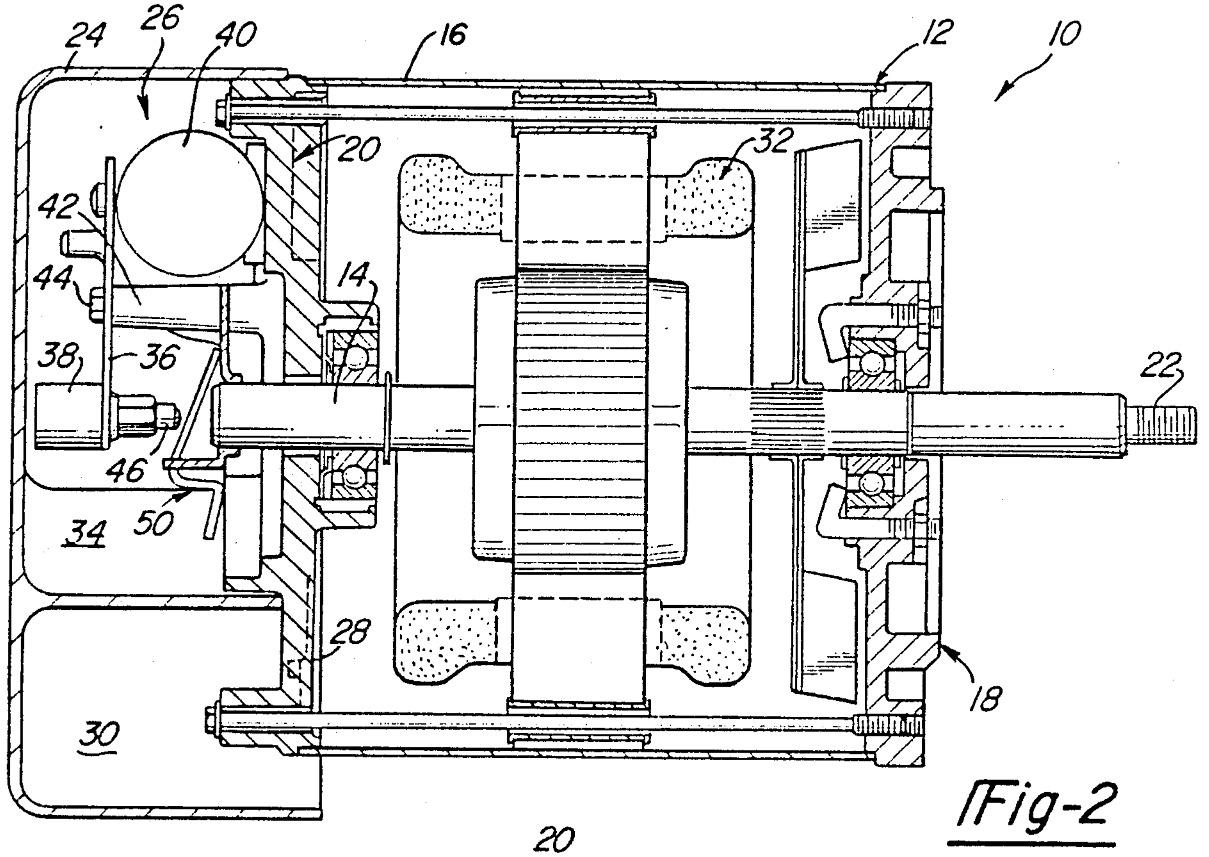
FIG. 2 is a cross-sectional perspective of the motor assembly taken along line 2—2 of FIG. 1.
Figure 3:
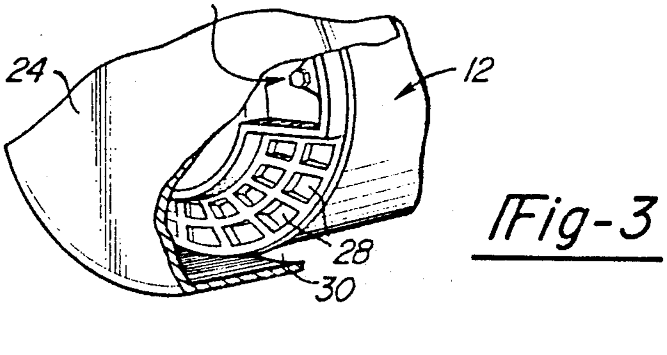
FIG. 3 is a partial end perspective of the motor assembly showing the vent passageways.
Figure 4:
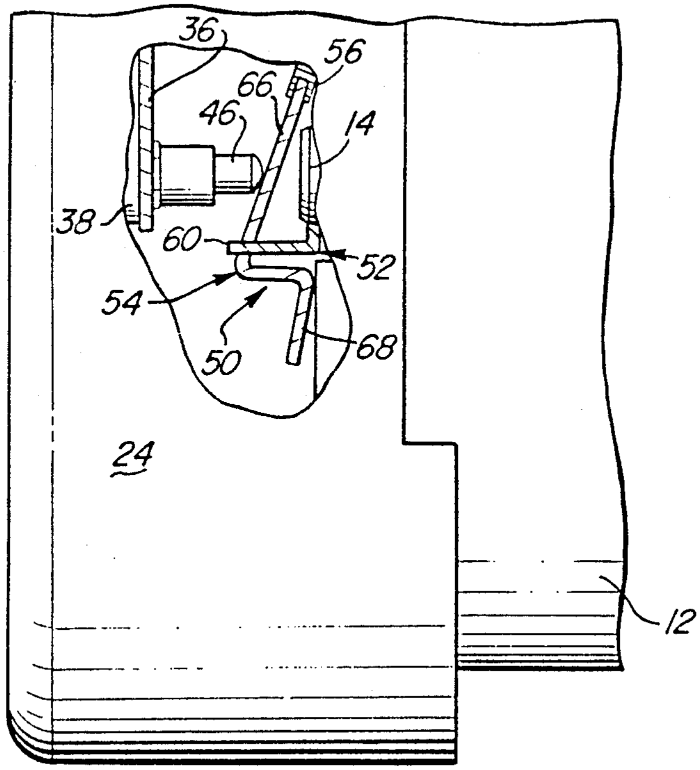
FIG. 4 is a partial perspective of the motor showing the governor assembly of the present invention.
Figure 5:
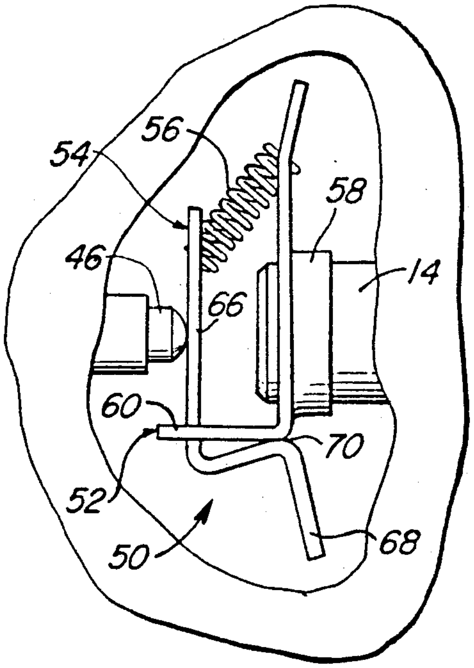
FIG. 5 is a side view of the governor assembly mounted to the rotor shaft in its at-rest position.
Figure 6:
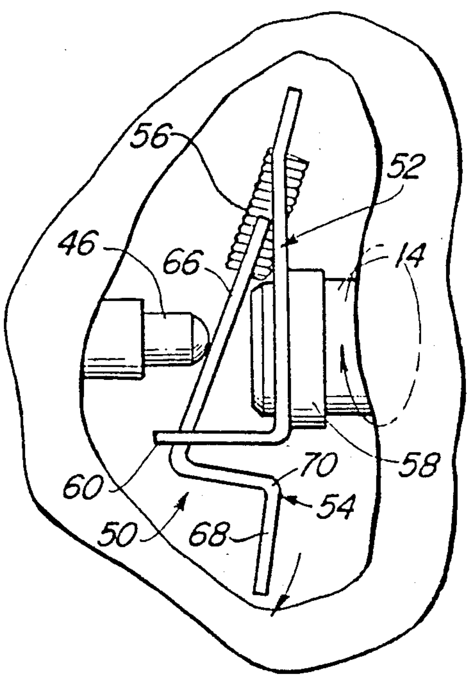
FIG. 6 is a side view of the governor assembly in its actuated position.

The present invention is directed to a factional horsepower electric motor assembly as shown in FIGS. 1 through 3 and particularly to a centrifugal governor assembly for an electric motor assembly as shown in FIGS. 4 through 6. Referring first to FIGS. 1 and 2, there is shown a motor assembly 10 embodying the present invention and generally comprising an outer housing 12 having a rotor shaft 14 extending therethrough. The housing 12 includes an outer shell 16 and end walls 18 and 20 adapted to retain and support the rotor shaft 14. In use, the end wall 18 will be attached to a pump housing such that the threaded end 22 of the rotor shaft 14 can be utilized to drive a pump impeller or the like. The other end of the shaft 14 extends into the end bell of the motor assembly 10 which houses the control components for the motor assembly 10 as will be subsequently described. The motor assembly 10 is of the type normally defined as a single phase motor which can efficiently operate on a single winding. However, because of the energy needed to start the motor, a second start winding is utilized in conjunction with the run winding to initially operate the motor. Once the motor has reached a predetermined rotational speed, the start winding can be shut down such that the motor assembly 10 operates as a single phase motor.

Referring now to FIGS. 1 through 3, attached to the end of the motor housing 12 is an end bell cover 24 which provides the dual function of enclosing the control components 26 while also providing indirect venting of the motor assembly 10. While in past known motor assemblies the outer shell has been provided with a series of vent openings, it has been found that this unduly increases the size of the motor housing in order to meet regulatory requirements. In the present invention, the end wall 20 is provided with a plurality of vent openings 28 which communicate with the end bell cover 24. Accordingly, the end bell cover 24 is provided with a substantially U-shaped, indirect vent passageway 30 which provides communication between the exterior of the motor assembly 10 and the interior of the motor housing 12 in order to ensure proper cooling of the stator assembly 32 while preventing water and the like from reaching the windings. In a preferred embodiment, the vent openings 28 and the vent passageways are formed on only the lower half of the motor assembly 10 in order to provide sufficient space for the control components 26 as shown in FIGS. 2 and 3.

FIG. 2 shows the interior components of the motor assembly 10 including the stator assembly 32 and the rotor shaft 14 which extends through the housing 12 and is supported by the end walls 18 and 20. Housed within the end bell cover 24, in a compartment 34 which is isolated from the vent passageway 30, are the control components 26 for the motor 10. In the preferred embodiment of the present invention, the components 26 are mounted in proximity to the rotor shaft 14 such that mounting hardware is minimized thereby reducing assembly time and simplifying repair and replacement of the components 26. Generally, the control components 26 include a terminal board 36, a switch 38, a capacitor 40, and a governor assembly 50. The terminal board 36 is the only component directly secured to the motor assembly. In the embodiment shown, the end wall 20 includes at least one mounting arm 42 integrally formed therewith and extending substantially perpendicular to the wall 20. Preferably, the arm 42 includes a tapped hole adapted to receive a mounting bolt 44 utilized to secure the terminal board 36 to the arm 42. Mounted to the terminal board 36 is the actuator switch 38. The body of the switch 38 is disposed on one side of the board 36 while the spring-biased actuator pin 46 is disposed on the opposing side. The switch 38 is mounted to the board 36 such that the pin 46 is axially aligned with the rotor shaft 14 and in contact with the governor assembly 50 as will be subsequently described. In addition, the terminal board 36 positionally maintains the capacitor 40 by sandwiching the capacitor 40 between the board 36 and the end wall 20. As a result, no hardware is required to retain the capacitor 40 although removal of the terminal board 36 will cause the capacitor 40 to fall out of position. Thus, the arrangement of the control components 26 reduces space requirements within the end bell 24 while also reducing manufacturing and repair costs and the overall weight of the motor assembly 10.

The governor assembly 50, as shown in FIGS. 4 through 6, reacts to the centrifugal forces generated by the rotating motor shaft 14 in order to shut off the start winding of the motor through the switch 38 once a predetermined rotational speed is reached. Preferably, when 75–80% of synchronous or full speed is reached, the switch 38 takes power out of the start winding and the motor 10 operates on the run winding alone. FIG. 5 shows the governor assembly 50 and the rotor shaft 14 in an at-rest position. FIG. 6 shows the governor assembly 50 as it is affected by the rotational torque of the rotor shaft 14. In the preferred embodiment, the governor assembly 50 is removably mounted to the end of the rotor shaft 14 in close proximity to the switch 38. Since the actuator pin 46 of the switch 38 is axially aligned with the rotor shaft 14 the governor 50 will be in constant contact with the pin 46. In fact, the actuator pin 46 will be in contact with the rotational axis of the governor 50 such that the pin and switch will not be significantly affected by rotation of the governor assembly 50. Moreover, the switch 38 and spring-biased actuator pin 46 ensure that the governor 50 stays on the rotor shaft 14, although no mounting hardware is utilized thereby permitting removal of the governor assembly 50 upon removal of the terminal board 36.

Referring now to FIGS. 5 and 6, the governor assembly 50 generally comprises a carrier plate 52 mounted to the rotor shaft 14, a lever 54 pivotably attached to the carrier plate 52, and a compression spring 56 extending between the carrier plate 52 and the pivotable lever 54. The carrier plate 52 includes an annular mounting sleeve 58 formed integrally therewith and adapted to receive the rotor shaft 14. The mounting sleeve 58 forms an annular opening through which the rotor shaft extends. The governor assembly 50 is maintained on the rotor shaft 14 by the frictional engagement between the sleeve 58 and shaft 14. However, upon removal of the terminal board 36 the governor 50 can be manually removed from the end of the rotor shaft 14.

Figure 7:
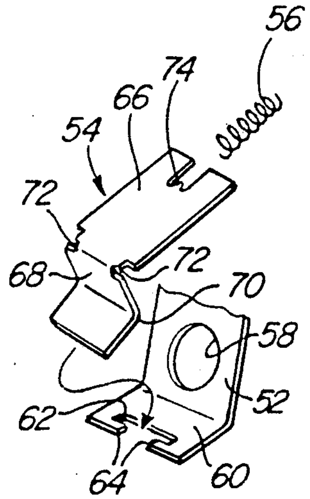

Extending from a first end of the carrier plate 52 is a fulcrum member 60 adapted to receive the pivotable lever 54. In a preferred embodiment, the fulcrum 60 is integrally formed with and extends perpendicular to the carrier plate 52. When the governor 50 is mounted to the shaft 14, the fulcrum 60 extends towards the terminal board 36 and away from the rotor shaft 14. Formed near the remote end of the fulcrum 60 is a transverse slot 62 which is open to the end of the fulcrum member 60 in order to permit assembly of the governor. However, the slot 62 has a greater length such that flange shoulders 64 will retain the pivotable lever 54 within the slot 62 (FIG. 7).

The lever 54 is adapted to be pivotably mounted to the fulcrum 60 and includes an actuating arm 66 which engages the actuating pin 46 of the switch 38 and an integral extension 68 which acts as a pendulum to pivot the lever 54 in response to the rotational forces. The extension 68 has a substantially L-shaped configuration depending inwardly towards the rotor shaft 14. In addition to acting as a pendulum for the lever 54, the elbow 70 of the L-shaped extension acts as a limiting structure to prevent the lever 54 from pivoting beyond a predetermined position such as that shown in FIG. 5. Formed in the pivotable lever 54 where the actuating arm 66 joins the extension 68 are opposing notches 72. The notches 72 are formed such that the lever 54 will have two different widths, one to facilitate insertion of the lever 54 between the flanges 64 of the fulcrum 60 and the other width adapted to retain the lever 54 beneath the flanges 64 within the slot 62. In this manner, the governor 50 can be manually assembled and does not require additional hardware which would affect the size and weight thereof. Formed at the distal end of the actuating arm 66 is a prong 74 to receive and secure the spring 56.

The spring 56 is connected, at each of its ends, to the actuating arm 66 of the pivotable lever 54 and the carrier plate 52. Preferably, the spring 56 is compressible from its normal position shown in FIG. 5 to a fully compressed position shown in FIG. 6. Accordingly, the spring 56 will bias the lever 54 towards the switch 36 and any centrifugal force acting on the lever 54 must overcome the compression or restorative force of the spring 56. Furthermore, because the centrifugal force acting on the pivotable lever 54 causes the spring 56 to compress, the spring 56 will not become deformed due to stretching and will naturally bias the lever 54 towards the switch 38 and its at-rest position. In addition, the lever 54 is prevented from pivoting beyond the at-rest position by the limiting elbow 70 contacting the carrier plate 52 thereby preventing stretching and deformation of the spring 56.

The governor assembly 50 of the present invention is positioned and adapted to provide efficient operation of the motor assembly 10 while ensuring proper shutdown of the start winding as necessary. The governor assembly 50 is mounted to the shaft 14 such that it is in constant contact with the actuator pin 46 of the switch 38. Since the actuator pin 46 is axially aligned with the rotor shaft 14, the pin 46 will continuously contact the rotational center of the governor 50 and more particularly the actuating arm 66. In this manner, frictional drag will not affect the governor 50 although the pin 46 is in constant contact with the pivotable lever 54 and therefore instantaneously responsive to the movements of the actuating arm 66.

Operation of the motor assembly 10 will continuously affect the governor 50 in order to control operation. With the rotor shaft 14 and governor 50 at rest (FIG. 5) the compression spring 56 will bias the actuating arm 66 of the pivotable lever 54 towards the switch 38 thereby fully depressing the actuating pin 46. As the rotor shaft 14 begins to rotate, the centrifugal forces acting on the governor 50 will cause the L-shaped extension 68 of the pivotable lever 54 to move radially outward. In essence, the extension 68 acts as a pendulum which is forced outwardly by the rotation of the governor 50 (FIG. 6). As the extension 68 moves outwardly in response to the centrifugal force, the lever 54 will pivot at the fulcrum 60 thereby causing the actuating arm 66 to pivot away from the switch 38 against the force of the spring 56. As rotation increases, the lever 54 will continue to pivot against the force of the spring 56 until the actuating pin 46 extends past a predetermined position to shut down the start winding through the control components 26. Conversely, when the motor is shut off and rotation decreases, the compression force of the spring 56 will once again overcome the centrifugal force acting on the governor 50. The spring 56 will bias the actuating arm 66 of the pivotable lever 54 towards the switch 38 depressing the actuating pin 46. The lever 54 will move again to its at-rest position (FIG. 5) without any deformation of the biasing spring 56. Thus, the governor 50 provides continuous efficient operation utilizing a simple structure. As has been noted, in a preferred embodiment of the present invention, the governor 50 and the control component 26 cooperate to shut off the start winding when 75-80% of full speed is reached such that the motor 10 operates as a true single phase motor on only the run winding.

The simple arrangement of the components of the motor assembly 10 provides for efficient operation while also ensuring ease of assembly and repair. Moreover, by minimizing the size and weight of the motor 10 through the use of interdependent control components and an indirectly vented housing, the possible applications can be significantly increased. Finally, the structure of the governor 50 lends itself to a wide variety of applications according to the requirements of a particular motor assembly. The sensitivity of the governor 50 can be altered by varying the compression spring 56 or changing the length, width or weight of the extension 68. In this manner, the governor 50 can be made more sensitive to the centrifugal forces acting thereon or can require increased forces in order to overcome the compression force of the spring 56.

The foregoing detailed description has been given for clearness of understanding only and no unnecessary limitations should be understood therefrom as some modifications will be obvious to those skilled in the art without departing from the scope and spirit of the appended claims.

I claim:

1. An improved electric motor assembly having a motor housing with a stator assembly disposed therein and a rotor shaft extending therethrough, one end of said rotor shaft extending through an end wall of said housing into an end bell of said motor assembly, said end bell having a control assembly for said motor, said control assembly comprising:

- a terminal board fixedly secured to said end wall of said motor housing;
- a switch mounted to said terminal board, said switch including an actuator pin extending axially inward from said terminal board;
- a capacitor positionally captured between said terminal board and said end wall of said motor housing; and a centrifugal governor mounted to said one end of said rotor shaft to rotate therewith, said governor engaging said actuator pin of said switch wherein said switch is actuable in accordance with the centrifugal force generated by said rotor shaft and acting upon said governor.

2. The improved motor assembly as defined in claim 1 and further comprising an end bell cover secured to said motor assembly to house said control assembly, said end bell cover including means for indirectly venting said motor assembly.

3. The improved motor assembly as defined in claim 2 wherein said end bell cover includes a main compartment housing said control assembly and a vent passageway communicating with vent openings formed in the end wall of said motor housing and the exterior of said motor assembly, said vent passageway having a substantially U-shaped cross-sectional configuration to form said indirect venting means.

4. The improved motor assembly as defined in claim 1 wherein said centrifugal governor comprises a carrier plate mounted to said rotor shaft, a fulcrum member extending from said carrier plate, and a lever pivotably connected to said fulcrum member, said pivotable lever adapted to selectively actuate said switch.

5. The improved motor assembly as defined in claim 4 wherein said pivotable lever includes an actuating arm disposed on one side of said fulcrum member and an L-shaped arm disposed on an other side of said fulcrum member, said actuating arm of said lever being resiliently connected to said carrier plate by a compression spring.

6. The improved motor assembly as defined in claim 5 wherein said compression spring biases said pivotable lever against said actuating pin of said switch whereby the compression force of said spring is progressively overcome by the centrifugal force on said governor thereby pivoting said actuating arm of said lever away from said actuator pin of said switch.

7. The improved motor assembly as defined in claim 6 wherein said capacitor and said governor may be removed and replaced upon disconnection of said terminal board.

* * * * *